United States Patent
Genc et al.

(10) Patent No.: US 11,374,409 B2
(45) Date of Patent: Jun. 28, 2022

(54) POWER SYSTEM LOAD FLEXIBILITY FORECASTING

(71) Applicant: Savant Technologies LLC, East Cleveland, OH (US)

(72) Inventors: Sahika Genc, Niskayuna, NY (US); Deepak Aravind, Karnataka (IN); Yan Pan, Niskayuna, NY (US); Naresh Acharya, Niskayuna, NY (US); Chaitanya Ashok Baone, Glenville, NY (US)

(73) Assignee: Savant Technologies LLC, East Cleveland, OH (US)

( * ) Notice: Subject to any disclaimer, the term of this patent is extended or adjusted under 35 U.S.C. 154(b) by 0 days.

(21) Appl. No.: 15/477,696

(22) Filed: Apr. 3, 2017

(65) Prior Publication Data

US 2018/0287382 A1 Oct. 4, 2018

(51) Int. Cl.
*H02J 3/14* (2006.01)
*G05B 17/02* (2006.01)
(Continued)

(52) U.S. Cl.
CPC ............... *H02J 3/14* (2013.01); *G05B 17/02* (2013.01); *H02J 3/381* (2013.01); *H02J 3/003* (2020.01);
(Continued)

(58) Field of Classification Search
CPC ..... H02J 2003/003; H02J 3/14; Y04S 10/542; Y04S 20/44; G06Q 30/021; G06Q 10/04; Y10S 705/00; G05B 19/00; G05B 17/02
See application file for complete search history.

(56) References Cited

U.S. PATENT DOCUMENTS 8,340,831 B2 * 12/2012 Benitez ............... G01D 4/004
700/291
8,396,572 B2 3/2013 Torzhkov et al.
(Continued)

FOREIGN PATENT DOCUMENTS

WO 2015/077754 A1 5/2015

OTHER PUBLICATIONS

Samuel Burer et al., "Non-convex mixed-integer nonlinear programming: A survey", 2012, Surveys in Operations Research and Management Science, vol. 17, pp. 97-106 (Year: 2012).*
(Continued)

*Primary Examiner* — Kenneth M Lo
*Assistant Examiner* — Jonathan Michael Skrzycki
(74) *Attorney, Agent, or Firm* — Cesari and McKenna, LLP

(57) ABSTRACT

The example embodiments are directed to a system and method for forecasting load flexibility of a power grid. In one example, the method includes receiving temperature values associated with temperature set points of a plurality of loads that are included on a power grid, forecasting a flexibility of the plurality of loads using a polynomial-time mixed-integer non-linear programming (MINLP) optimization based on the received temperature values for the plurality of loads, and outputting information about the forecasted flexibility for display to a display device. The MINLP optimization performs the forecasting of the load flexibility on a fine-grained basis in comparison to conventional methods and is still fast enough that it can be computed in real-time.

20 Claims, 6 Drawing Sheets

(51) Int. Cl.
H02J 3/38 (2006.01)
H02J 3/00 (2006.01)
(52) U.S. Cl.
CPC .......... *Y02B 70/3225* (2013.01); *Y04S 20/222* (2013.01)

(56) References Cited

U.S. PATENT DOCUMENTS

| | | | |
|---|---|---|---|
| 8,417,391 B1* | 4/2013 | Rombouts | G05B 13/02 700/286 |
| 9,020,874 B2 | 4/2015 | Zhang et al. | |
| 2004/0220786 A1* | 11/2004 | Tiwari | G06F 17/10 703/2 |
| 2013/0006429 A1 | 1/2013 | Shanmugam et al. | |
| 2013/0282181 A1* | 10/2013 | Lu | H02J 3/14 700/275 |
| 2014/0365022 A1 | 12/2014 | Ghosh et al. | |
| 2015/0094968 A1* | 4/2015 | Jia | G06Q 40/04 702/60 |
| 2015/0288186 A1 | 10/2015 | Sun et al. | |
| 2015/0370271 A1* | 12/2015 | Raghunathan | B60H 1/00821 700/277 |

OTHER PUBLICATIONS

Yuehong Lu et al., "Optimal scheduling of buildings with energy generation and thermal energy storage under dynamic electricity pricing using mixed-integer nonlinear programming", 2015, Applied Energy, vol. 147, pp. 49-58 (Year: 2015).*

Alex Rogers, Adaptive Home Heating Control Through Gaussian Process Prediction and Mathematical Programming, published May 2, 2011; Second international workshop on agent technology for energy systems; Retrieved from URL<https://eprints.soton.ac.uk/272235/> (Year: 2011).*

P.M. Ferreira, 'Neural networks based predictive control for thermal comfort and energy savings in public buildings', Energy and Buildings 55, 2012, pp. 238-251, URL:<https://www.sciencedirect.com/science/article/pii/S037877881200388X> (Year: 2012).*

Jon Lee, "Mixed Integer Nonlinear Programming", Springer textbook, retrieved from the internet URL:<https://link.springer.com/book/10.1007/978-1-4614-1927-3> (Year: 2012).*

Catalao, J.P.S. et al., "Mixed-Integer Nonlinear Programming for Head-Dependent Short-Term Hydro Scheduling", International Conference on Power Engineering, Energy and Electrical Drives (POWERENG), Mar. 18-20, 2009., (pp. 90-94, 5 total pages).

Nagasaka, K. et al., "A Research On Operation Planning Of Multi Smart Micro Grid", Proceedings of the 2012 International Conference on Advanced Mechatronic Systems (ICAMechS), Sep. 18-21, 2012, (pp. 351-356, 6 total pages).

Malekshah, Soheil et al., "Combined Heat And Power Sizing In Residential Building Using Mixed Integer Nonlinear Programming Optimization Method", 2016 24th Iranian Conference on Electrical Engineering (ICEE), May 10-12, 2016, (pp. 1208-1213, 6 total pages).

* cited by examiner $T_{zone}$ = zone temperature
$T_{OA}$ = outside air temperature
$T_{set}$ = set point temperature
$T_{SA}$ = supply air temperature
$V_{SA}$ = supplu air rate
$Q_{sa}$ = supply air flow

POWER SYSTEM LOAD FLEXIBILITY FORECASTING

GOVERNMENT INTEREST

The present invention was made with Government support under contract number DE-AR0000698 awarded by the United States Department of Energy. The Government has certain rights in this invention.

BACKGROUND

The electric power grid contains limited inherent facility for storing electrical energy. Electricity must be generated in a balanced manner to meet uncertain demand, which often results in either over or under commitment or dispatch of the power generation, hence system inefficiency, system insecurity and power failures. Furthermore, the amount of electricity provided from weather-dependent sources (i.e., clean energy) such as wind energy and solar energy continues to grow. However, clean energy sources suffer from intermittency. As a result, grid operators are reluctant to rely heavily on these resources making it difficult to move away from standard, typically carbon-intensive forms of electricity. Distributed electric resources can provide a solution for addressing some of these problems. However, current power services infrastructure lacks provisioning and flexibility that are required for aggregating a large number of small scale resources to meet the larger scale needs of power services. As a result, there are significant opportunities for improvement in the tracking and balancing of the electrical power grid.

Tracking the load of a system is a basic requirement in the operation, maintenance, scheduling and control of power systems. In particular, with the development of a smart grid that allows power producers and users to respond intelligently to the actual system and market conditions, load forecasting is becoming integral. Load forecasting may provide useful information that can be used to reduce the cost of electricity to consumers. Numerous daily operations of a power factory such as unit commitment, economical dispatch, and automatic general control, can benefit from forecasting the system load ahead of time. Load forecasting may also facilitate decision and management. For example, knowing the maximum system load can help maintenance scheduling and hydro-thermal coordination. Furthermore, load forecasting can guarantee secure and uninterrupted power supply for energy commercialization.

SUMMARY

Embodiments described herein improve upon the prior art by providing a system and method for forecasting load flexibility based on a nominal power demand. The load forecasting may be performed at a fine-grained level (e.g., on a load-by-load basis) rather than at a macro level. In addition, the forecasting may be performed with a calculation speed that is fast enough to be performed by a computing device in real-time. Accordingly, load forecasting may be performed at faster intervals and accommodate rapidly changing variables in the power system and available resources.

In an aspect of an example embodiment, provided is a computer-implemented method for forecasting load flexibility based on a nominal power demand, the computer-implemented method comprising receiving temperature values associated with temperature set points of a plurality of loads that are included on a power grid, forecasting a flexibility of the plurality of loads using a polynomial-time mixed-integer non-linear programming (MINLP) optimization based on the received temperature values for the plurality of loads, and outputting information about the forecasted flexibility for display to a display device.

In an aspect of another example embodiment, provided is a computer system for forecasting load flexibility based on a nominal power demand, the computer system including a network interface configured to receive temperature values associated with temperature set points of a plurality of loads that are included on a power grid, a processor configured to forecast a flexibility of the plurality of loads using a polynomial-time mixed-integer non-linear programming (MINLP) optimization based on the received temperature values for the plurality of loads, and an output configured to output information about the forecasted flexibility for display to a display device.

In an aspect of another example embodiment, provided is a non-transitory computer readable medium having stored therein instructions that when executed cause a computer to perform a method for forecasting load flexibility based on a nominal power demand, the method including receiving temperature values associated with temperature set points of a plurality of loads that are included on a power grid, forecasting a flexibility of the plurality of loads using a polynomial-time mixed-integer non-linear programming (MINLP) optimization based on the received temperature values for the plurality of loads, and outputting information about the forecasted flexibility for display to a display device.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
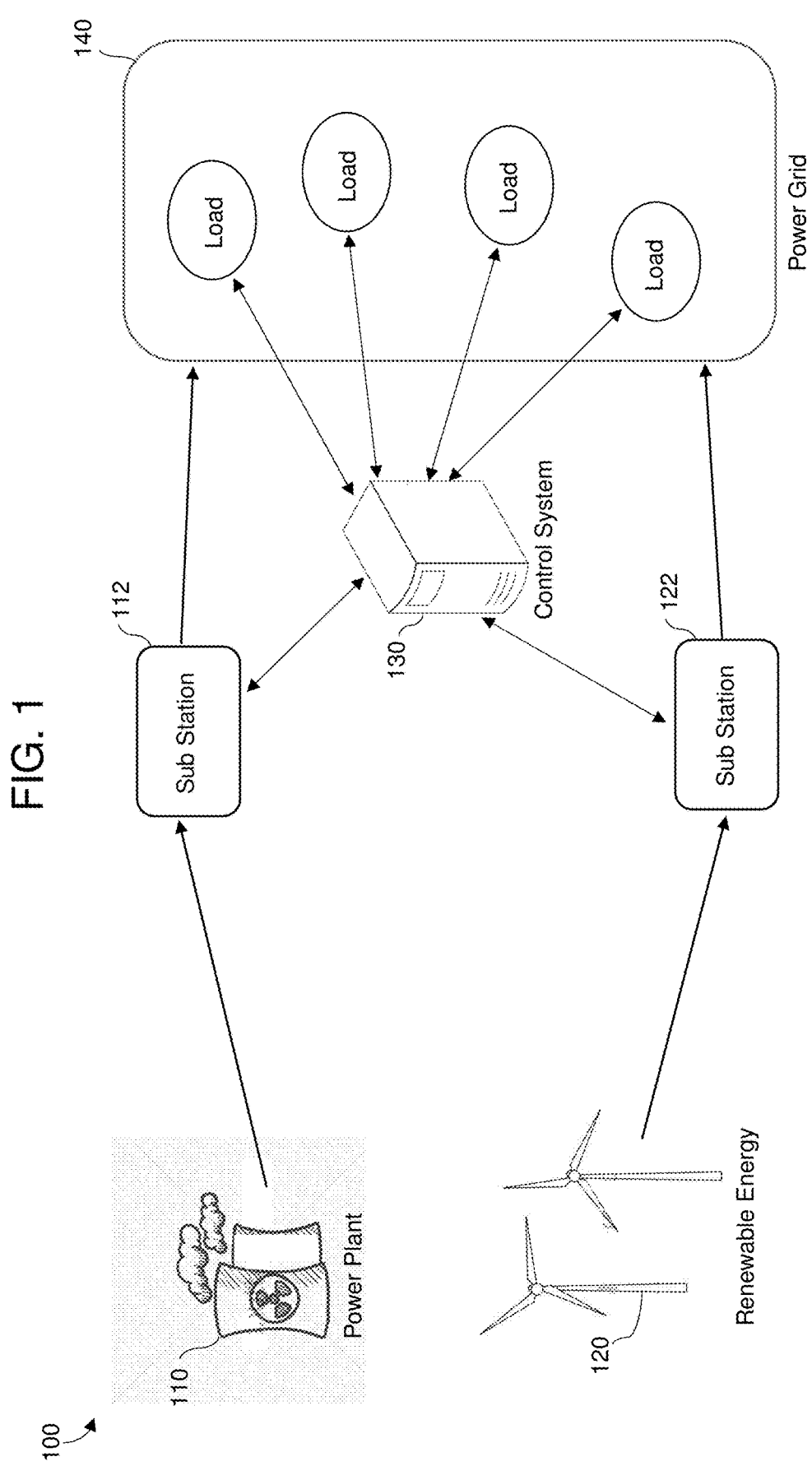
FIG. 1 is a diagram illustrating a system for forecasting load flexibility in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a mixed-integer nonlinear programming (MINLP) approach for long-term load flexibility forecasting. Long-term flexibility may be forecasted ahead of time, for example, 12 hours, 24 hours, 48 hours, or another amount of time. The forecasting may predict the flexibility of a load and may be used for day-ahead bidding in ancillary power markets. Clean energy such as solar and wind energy resources pose several challenges to large-scale integration of distributed generation from renewable energy sources (DG-RES) within electricity networks, mainly in terms of reliability and economic feasibility. The flexibility (i.e., the possibility to adapt or shift the electricity generation profile in time) that can be lost on the generation side due to resource variability needs to be compensated for by an increased flexibility of the transmission and distribution systems of the electricity markets. The concept of smart grids encompasses different technical solutions that enable flexibility from other sources, such that consumption and/or generation can be shifted with respect to time. For example, this can be achieved through enhanced monitoring and control functionalities, the use of (electrical and/or thermal) buffers, increased consumer participation, and the like.

The forecasting performed by the example embodiments differs from current state of art by defining and extending the forecasting to increase accuracy and reduce uncertainty by implementing a mixed-integer nonlinear programming scheme that utilizes a hybrid automata model of many (e.g., hundreds) of thermostatically controlled loads (TCLs). Prior approaches for controlling TCLs focus on reducing or relaxing the mixed-integer nonlinear programming problem to a less complex linear or dynamic programming problem. However, these relaxations reduce the accuracy due to the hybrid behavior (i.e., discrete switching, continuous time thermal dynamics, etc.) of a specific load during real-time operation. These switching constraints can become critical in practical applications due to the impact of load availability on ancillary services. Recent advancements in mixed-integer nonlinear programming pave the way for improved accuracy at a manageable computational complexity.

FIG. 1 illustrates a system 100 for forecasting load flexibility in accordance with an example embodiment. In this example, the system 100 is used to manage a power grid 140 that includes loads, for example, heat, ventilation and air-conditioning (HVAC) systems, thermostatically controlled loads (TCLS), lighting, water services, pool pumping, sewage treatment, and the like. The loads may be managed based on power provided from various power systems such as a power plant 110 and renewable energy sources 120. Although not shown in FIG. 1, various transmission lines may be implemented between the power plant 110, the renewable energy sources 120, sub-stations 112 and 122, and the power grid 140. FIG. 1 also includes at least one control system 130 which is used to manage the power provided to the power grid 140 based on the individual loads and the availability of resources provided by the various power systems. In the example of FIG. 1, the control system 130 is shown as a separate device, but it may be included within the power grid 140, within a load or group of loads, in a cloud computing system, and the like.

In operation, the power plant 110 may generate energy from various carbon-based sources while the renewable energy sources 120 (e.g., wind, solar, hydropower, geothermal, etc.) may be generated from weather-related and geographically related systems. Energy from the power plant 110 may be transmitted to the sub-station 112 via one or more transmission lines, and energy from the renewable energy sources 120 may be transmitted to the sub-station 122 via one or more other transmission lines. The substations 112 and 122 may provide power to the power grid 140 where it can be delivered to each of the loads. The substations 112 and 122 may change the voltages provided from the respective sources to control power flow to different types of loads (e.g., commercial, residential, farming, manufacturing, industrial, etc.). Power delivery from the sub-stations 112 and 122 to the load may be controlled by the control system 130.

According to various embodiments, load flexibility may be forecasted using software (e.g., an application, a program, a service, etc.) executed by or otherwise accessed by the control system 130. The load flexibility software may forecast or otherwise predict a future flexibility associated with the plurality of loads on the power grid 140.

Operating data may be transmitted and received between the control system 130 and the plurality of loads on the power grid 140. For example, information about set points, zone temperatures, air flow, and the like, may be communicated to the control system 130. Also, data may be transmitted and received between the control system 130 and the substations 112 and 122. Based on the data that is communicated to the control system 130, the control system 130 may control the amount of operating power provided to the loads. In an example in which the loads are TCLs or the like, the loads may provide values such as temperature related values to the control system 130 in order to enable the control system 130 to forecast the flexibility of the power grid 140. The values may include temperature related values such as zone temperature, outside air temperature, supply air flow rate, and the like. Based on the information provided from the loads, the control system 130 may forecast a flexibility of the plurality of loads using a polynomial-time mixed-integer non-linear programming (MINLP) optimization. The control system 130 may perform ancillary bidding based on the forecasted flexibility. For example, the control system 130 may perform day-ahead bidding in ancillary power markets. As another example, the control system 130 may control the operating power provided to the loads from one or more of the sub-stations 112 and 122.

As described herein, a flexible load is a type of load in which the electrical power or energy required for its operation can be varied by adjusting the operating set points of one or more of its components within its quality of services bounds. The dependence of the electrical power (energy) to the operating points can be linear or non-linear. In addition, the electrical power (energy) can be sensitive to external disturbances such as outside air temperature. Examples of flexible load include heat, ventilation and air-conditioning (HVAC) systems, lighting, and waste water, pool pumping, and the like. Positive (or negative) flexibility of a specific load is the difference between the maximum (minimum) and nominal power consumption within its quality of service parameters with respect to a set of actuation variables.

For example, when a temperature set point of a heating system is increased while the change in an external temperature and thermal load is relatively constant, the electrical power required to heat up the air is higher, otherwise, the system may be switched on for a longer amount of time. According to various embodiments, the flexible load may be modeled as a dynamical system that describes the evolution of a state over time. The behavior of flexible loads is rather complex, exhibiting hybrid behavior in space and time. In general, the behavior of the system is approximated to a simpler continuous-time model to reduce the complexity.

In the examples provided, the model emulates smart thermostats that manipulate the inputs to the HVAC system that interface with a user. However, the loads are not limited to thermostats, but are merely used herein for purposes of example. One advantage of this emulation approach is that the hardware required for the controls reduces to the thermostat rather than replacing or retrofitting the real-time and supervisory control hardware at the thermostatically-controlled load (TCL) level. Therefore, only the inputs of the HVAC system at the thermostat level may be considered. The most common thermostat-level manipulated variables include the zone temperature set point, dead-band, on/off switching time limits within mechanical lifting limits, and manual user-driven switching. For example, a Nest™ thermostat manipulates the zone temperature set points and on/off switching by learning the schedule of the occupants and prior settings in memory.

The flexibility of a load can be achieved by adjusting the TCL's operating points, for example, zone set point temperature and flow rate. The zone set point temperature can be adjusted on a daily basis by programmable or remote controlled thermostats. The TCL can be switched on or off by increasing or decreasing the zone temperature set point accordingly. The zone set point adjustment is subjective and can offer larger flexibility over longer periods, hence, can provide both regulation and ramping services within comfort level of the occupants. The zone set point adjustments can be achieved on Constant Air-Volume (CAV) and Variable Air Volume (VAV) devices. On the other hand, adjusting the flow rate through variable fan speed control is possible only for VAV devices and can be used for regulation services only. To control the supply fan speed may include access to the device-specific controllers for TCL while programmable thermostats have standard plug-ins to connect to a wider range of TCLs. Therefore, it is more practical to indirectly control TCLs through set point changes at the thermostat. The disadvantage of this approach is that the state of the TCL device needs to be estimated, i.e., a TCLs that is switched on may stay on for a certain period of time to reduce mechanical wear due to frequent switching.

In various examples herein, when aggregated over a large number of heterogeneous loads, the error in the approximations results in a non-optimal utilization of flexible loads. In the example embodiments, a more general class of flexible loads are modeled as hybrid automata, i.e., hybrid state evolution in discrete-time domain. Here, by modeling the switching behavior of the load, whether the flexible load will be available when the ancillary service signal is received may be determined and therefore, provide increased accuracy in availability estimation. In the following examples, two flexible loads common to communities such as cooling a load of a residential building and waste water pumping are considered. However, it should be appreciated that the flexibility prediction described herein may be applied to different types of loads.

In these examples, the load is a TCL. The TCL provides air at constant temperature and flow rate to cool or heat a unit such as residential or commercial. The TCL's control components include actuators (compressor, fan, damper), sensors (thermocouple), and controllers (proportional, integral, and differential) to regulate the temperature and flow rate. The residential unit will cool or heat at a rate dependent on the volume of the space, thermal capacitance and resistance of the walls, furniture, and thermal load (e.g., humans, light).

The optimal temperature control problem has been studied extensively in the past for the linear system case.

$$\dot{\theta}(t) = -a(\theta - \theta_a) + bu(t) \quad \text{(Equation 1)}$$

where $u(t)$ is the rate of heating or cooling supply to the room, and $a = 1 = RC$; $b = 1 = C$ where $R$ and $C$ are external wall resistance and fast moving air capacitance. However, in practice, the order of operation of the TCL can be described by discrete states such as On=1 and Off=0, based on the difference between the zone set point and zone temperatures within the dead band. The dynamic behavior of the room in response to the set point change is based on air and wall capacitance and resistance and heat exchange driven by the supply air and outside air temperatures and can be described by an analog electrical circuit diagram. If it assumed that the wall capacitance is too large and lump wall and air resistance accordingly and ignore the radiation heat gain consider the following difference equation governing the zone temperature. Here, we consider two extensions of the popular Equation (1): 1) Linear TCL:

$$\dot{\theta}(t) = -a(\theta - \theta_a) + b(u(t) + \gamma(t)) \quad \text{(Equation 2)}$$

and 2) nonlinear TCL with dynamic thermal load due to occupancy.

$$\dot{\theta} = -a(\theta - \theta_a) - b(\theta - \theta_s)u(t) \quad \text{(Equation 3)}$$

where $u(t) = q(t)w(t)$ and $q(t)$ is the discrete switching state and $w(t)$ is the discrete or continuous flow rate depending on the TCL control architecture (CAV vs VAV).

Figure 2:
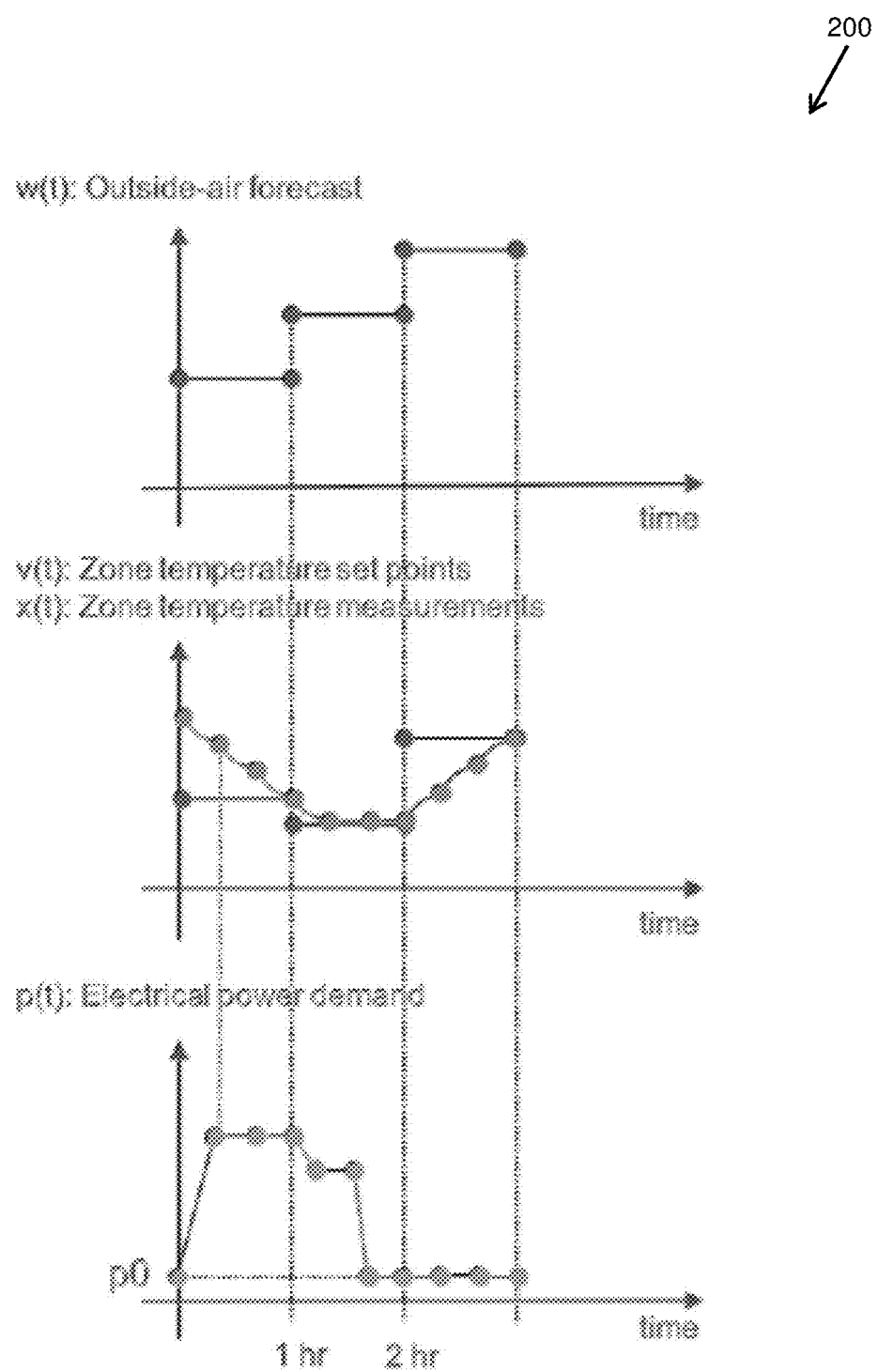
FIG. 2 is a diagram illustrating sampling times for signals considered in the optimization process in accordance with an example embodiment.

FIG. 2 illustrates exogenous, control, and TCL response signals in accordance with an example embodiment. As shown in FIG. 2, an outside-air temperature forecast is generally available at a slower rate (e.g. every hour) while the zone temperature and RTU power demand measurements can be obtained at a higher scale (e.g., minutes). The zone temperature set points may be calculated at the rate of available forecast or higher as needed. It is assumed that the outside-air temperature and required zone temperature set point trajectories have the same sample rate. In addition, it is assumed that the zone temperature and electrical power measurements have the same sampling rate. In addition, it is assumed that the RTU needs to maintain a certain minimum air flow rate during which the compressor may be off but the fans are on. In this example, the electrical power associated with maintaining minimum air flow requirement is equal to $P_0$.

One goal is to determine flexibility with respect to physical operation feasibility of the TCL within allowable comfort limits and normal operating voltage limits. For a single TCL, flexibility can be defined as the minimum and maximum deviation from the nominal power demand while maintaining quality of service during normal power grid operating voltage limits. The flexibility of TCLs may be independent although there may be a loose coupling among TCLs. Power draw of the TCL is determined mostly by the compressor, (i.e., 80% of the total power demand) while the fans account for the rest. Therefore, the three-phase or ZIP models for fans are ignored here.

The power draw of the compressor is a function of the discrete state q, ambient temperature w, and voltage V. The dependence on the ambient temperature is attributed to compressor operation. As the temperature gets higher, the heat rejection ability decreases resulting in compressor working against a greater pressure difference between the evaporating and condensing pressures. Assuming normal operating conditions for the power distribution grid, the dynamic dependency on the voltage in the cost function may be ignored. To capture the dependency on the normal operating conditions, voltage limit constraints may be introduced and a constant power rating associated with the operating voltage V(t) of the distribution grid may be assumed which is incorporated into P0(V; t). Mathematically, the power demand may be written similar to weather patterns as follows:

$$P(q,\theta_a,V,t)=S_0\theta_a(t)q(t)+P_0(V,t) \quad \text{(Equation 4)}$$

where q(t) is associated with the switching of the compressor rather than the switching of the entire TCL components. The MINLP optimization problem to minimize (or maximize) the deviation from the nominal power demand when the system is operated under constant set point temperature with optimized comfort (e.g., 72 Fahrenheit in a commercial office building results in 5-10% percent population dissatisfied (PPD)) as follows:

$$\min_{v=[v(\tau),\ldots,v(n\tau)]} \sum_{n=1}^{N} J(n) \quad \text{(Equation 5)}$$

subject to $\forall n = 1 \ldots N, t \in [(n-1)\tau, n\tau]$ (Equation 6)

$$\dot{x}(t) = f(x, q, w, t)$$
$$q(t) = H(x, v, t)$$
$$\underline{x}(n\tau) \le x(t) \le \overline{x}(n\tau)$$
$$\underline{V}(n\tau) \le V(t) \le \overline{V}(n\tau)$$
$$x \in \mathbb{R}^N, q \in \{0,1\}^N$$
$$w \in \mathbb{R}^N \text{ or } \in \{0, w_0\}^N$$

where the cost function at each sampling point n=1 ... N for a given outside-air temperature forecast is:

$$J(n)=\tfrac{1}{2}\sigma(x(n\tau)-v(n\tau))^2+\tfrac{1}{2}\int_{(n-1)\tau}^{n\tau}P(q,\theta_a,V,t)^2 dt \quad \text{(Equation 7)}$$

for some weighting a to be selected later, $x(t)=\theta(t)-\theta_a$ (n$\tau$), V (t) is the voltage, and H is the hybrid automaton describing the switching behavior. If $\sigma$ is large, then the optimal solution will have the zone temperature $x(n\tau)$ near the desired zone set point temperature $v(n\tau)$ at the sampling point n. Therefore, the zone temperature constraints are defined to be dynamic over the course of the finite optimization horizon but constant during the sampling of the outside-air temperature.

Figure 3A:
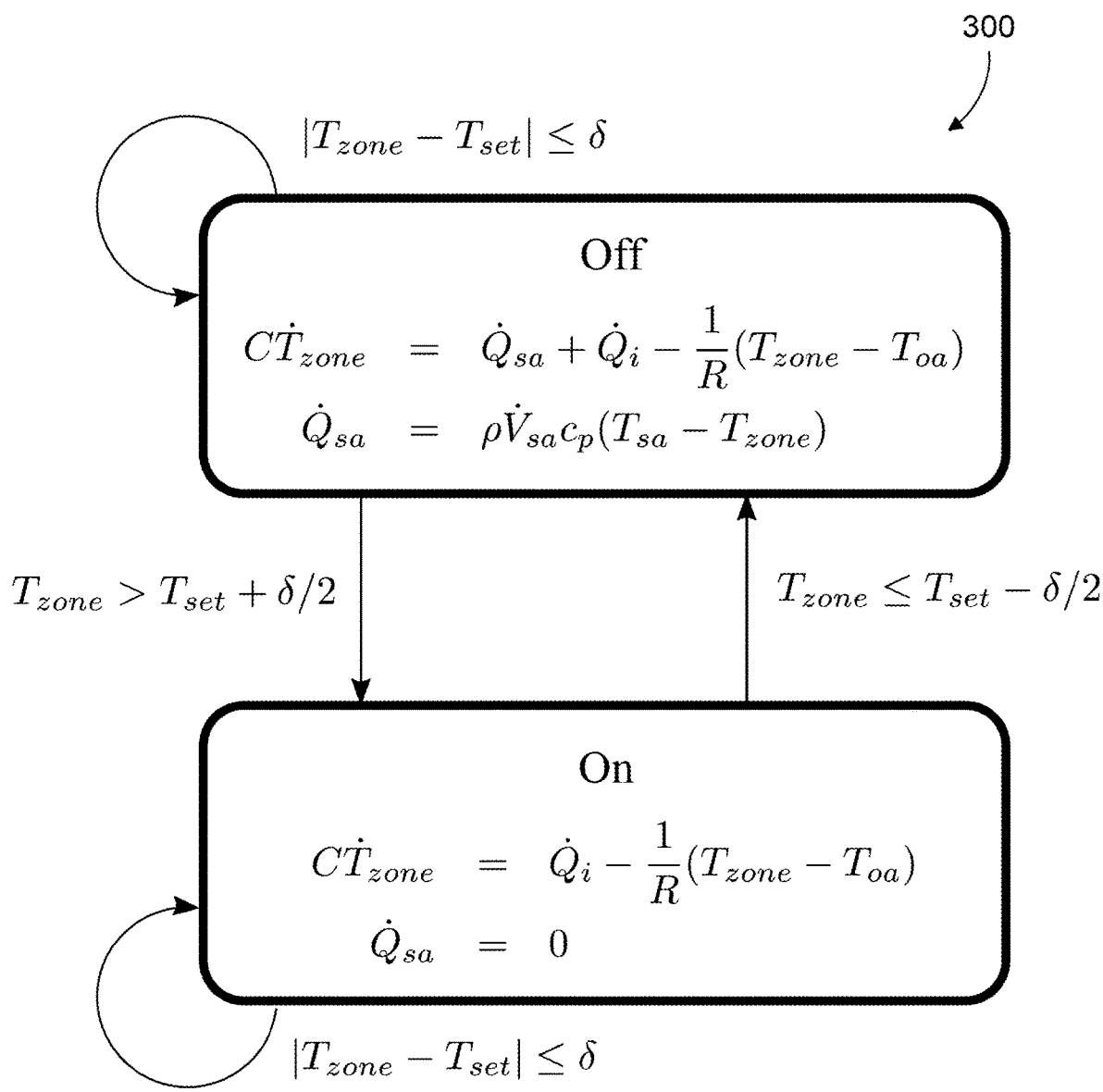
FIGS. 3A and 3B are diagrams illustrating examples of algorithms and branch and bound methods for performing load flexibility forecasting using MINLP optimization in accordance with example embodiments.
Figure 3B:
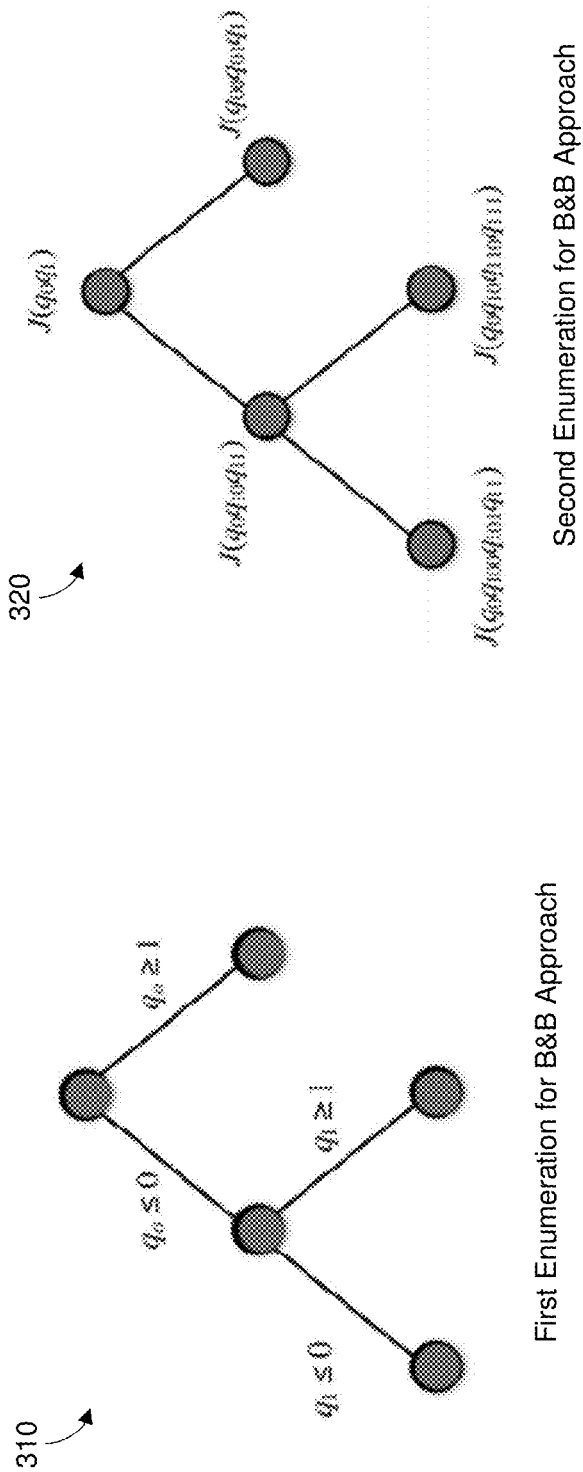

FIG. 3A illustrates an algorithm 300 for calculating an MINLP optimization in accordance with an example embodiment, and FIG. 3B illustrates examples of branch and bound (B&B) methods that may be used to perform the algorithm 300 in accordance with example embodiments. Solving the MINLP flexibility optimization problem in Equation 5 for the general class of hybrid system H is very complex. An illustration of the hybrid operation of the TCL is shown in FIG. 3A, and algorithm 300. Here, a hybrid automaton is a dynamical system that describes the evolution in time of the values of a set of discrete and continuous variables. In this example, Hybrid automaton H is a collection H=(Q, X, V, Y, Init, f, I, E, G, R), where Q is a set of discrete variables and Q is countable
X is a set of continuous variables;
V is a finite collection of input variables;
Y is a finite collection of output variables;
Init$\subseteq$Q$\times$X is a set of initial states;
f: Q$\times$X$\times$V$\to \mathbb{R}^n$ is a vector field;
h: Q$\times$X$\to$Y is a vector field;
Inv: Q$\to 2^{X\times V}$ assigns to each q$\in$Q an invariant set
E$\subset$Q$\times$Q is a collection of discrete transitions
G: E$\to 2^{X\times V}$ assigns to each e=(q,q')$\in$E a guard
R: E$\times$X$\times$V$\to 2^X$ assigns to each e=(q,q')$\in$E, x$\in$X and v$\in$V a reset relation.

In these examples, a subclass of the hybrid system includes the following properties: the state and output transition vector fields f and h are linear time-invariant, the guard function G is quasi 1-1. Given an edge and the current state values, the manipulated input values can be determined uniquely. f is independent of the input, i.e., f: Q$\times$X$\to \mathbb{R}$, and by definition, h is not a function of the input v directly. The output y is manipulated via the states which are directly impacted by the input.

When the above assumptions are satisfied, the aggregate flexibility optimization problem can be re-written in terms of the discrete switching states. Here, the above problem can be solved for $\{q_k(n)\}_{k;n}$ (switching states) and store $\{x_k(n)\}_{k;n}$ (zone and wall temperatures) to recover $\{v_k(n)\}_{k;n}$ (zone temperature set points) uniquely from the guard function. In solving the optimization, since f does not depend on the input v, qk(n) can be chosen to determine $x_k(n)$. Then, given $x_k(n)$, $q_k(n)$, we can check whether the constraints are satisfied. Furthermore, the constraints can be written in terms of availability, i.e., discrete state, across the load portfolio at any time point, and constraints can be removed on the manipulated input. The constraints on the state variables remain as they may relate to the quality of service (e.g., comfortable temperature levels in a room). However, there still remains a mixed integer nonlinear programming (MINLP) for the general nonlinear dynamic behavior of the building. In the following, several solution approaches including latest innovations in MINLP research are considered as well as their complexity and optimality.

The successful solutions to the convex MINLP include outer-approximation-based branch-and-cut methods and spatial branch-and-bound for global optimization. The branching-and-bound (B&B) methods that have been successfully applied to solve mixed-integer linear programming (MILP) problems can also be applied to solve the MINLP problems. Moreover, an extensive set of experiments have been conducted using a modern solver to compare the MINLP B&B approaches to other successful convex MINLP problems. The comparison of the best NLP-based B&B methods with Hybrid outer approximation-based (OA) option on 88 problems revealed that the OA method failed on 27 problems where sophisticated NLP-based B&B was successful. Therefore, we first consider NLP-based B&B methods as the solution.

The non-linearity in our problem stems from the building envelope model which is a constraint in our formulation. We can apply change of variables to remove the multiplicative non-linearity. Then, we apply B&B where at each node, we have a relaxation of q as q* and solve an augmented LP problem.

Linearization of f: A linear model with dynamic load may be used as in Equation (2). The flow rate may take an integer or real values depending on the type of the TCL control architecture. Since the zone temperature is a real number, then its multiplication with an integer will be a real number. Therefore, u(t) can also be a real number.

Continuous relaxation of J: Rewrite the cost function in terms of relaxation of q denoted as q*

$$J_n = \tfrac{1}{2}\sigma(x_n-v_n)^2 + \tfrac{1}{2}\theta_a^2(n\tau)\int_0^\tau (q_n^*)^2 dt \qquad \text{(Equation 8)}$$

Since the dynamic equations are given in terms of u(t), $q^*(t)=u^*(t)=w(t)$ can be substituted. An assumption can also be made that the flow rate w(t) is constant within one sampling period τ. Here, the cost function can be rewritten as:

$$J_n = \frac{1}{2}\sigma(x_n - v_n)^2 + \frac{1}{2}\underbrace{\frac{\theta_a^2(n\tau)}{w^2(n\tau)}}_{a_n}\int_0^\tau (u_n^*)^2 dt \qquad \text{(Equation 9)}$$

Next, the cost function can be augmented with the dynamic constraints via Lagrange multiplier denoted by λ(t). Note that we are not concerned with the final state x(nτ) be exactly equal to v(nτ), the state, co-state, and stationary condition equations can be used to solve for optimal u* (relaxation not optimal input) using the following equations (dropping the subscript n from x, u and γ to simplify notation for solving the differential equation system):

$$\dot{x} = -ax - bu^* + b\gamma \qquad \text{(Equation 10)}$$

$$\dot{\lambda} = a\lambda \qquad \text{(Equation (11))}$$

$$0 = \alpha u^* - b\lambda \qquad \text{(Equation (12))}$$

Solving the differential questions, it is determined that $$u^* = \frac{b}{\alpha}\lambda(\tau)e^{a(t-\tau)} \text{ and} \qquad \text{(Equation 13)}$$

$$x^* = -\frac{b^2}{a\alpha}\lambda(\tau)e^{-a\tau}\sinh(at) + \frac{b\gamma}{a}(1-e^{-at}) + x(0)e^{-at} \qquad \text{(Equation 14)}$$

Further, λ(τ) can be solved for by using the boundary condition equations as $$\lambda(\tau) = \sigma(x_n(\tau) - v_n) \qquad \text{(Equation 15)}$$

and substitute Equation 14 to solve for x(τ) in terms of σ and $v_n$. Note that x(τ) needs to satisfy the inequality constraints for comfort. Therefore, various values to get σ to acquire a good compromise between energy optimization within comfort constraints.

B&B for LP relaxation: The switching sequence q(τ), . . . , q(Nτ) may be calculated of a length N that minimizes the power within physical feasibility constraints. The complexity of the B&B approach depends on the initial condition and branching logic. The simplest branching logic will be to consider each switching decision a node of the branching tree and solve the LP relaxation by creating a child node corresponding to the node as shown in the branching tree 310 of FIG. 3B. Here, the number of nodes in the tree 310 at the worst case will be equal to 2N where N is the number of samples.

As another example, an alternative B&B tree 320 is shown in FIG. 3B which includes nodes that are associated with sequences of switches. Here, the branching decision is made to divide the switching sequence at sampling point n into before n and after n sequences. At each node, the cost and feasibility is calculated with respect to the first n−1 part of the sequence and compared to the feasibility and cost function with the parent node. When a sequence is not feasible at the parent node, then it is not feasible at the child nodes as well. Therefore, it can quickly be eliminated as an infeasible solution. The less effective case is equal to the simple tree approach but in practice we arrive at a solution faster. Additional benefits arise from reusing cost calculations from the parent node at the child node since $$J(q_0 q_1) = J(q_0) + J(q_1)|_{x_{q0}} \qquad \text{(Equation 16)}$$

$$J(q_0 q_{10} q_{11}) = J(q_0) + J(q_{10})|_{x_{q0}} + J(q_{11})|_{x_{q10}} \qquad \text{(Equation 17)}$$

ILP Relaxation:

In this scenario, the linearized model from MILP relaxation is used but the entire problem is converted to an integer programming one by discretizing the differential equation in Equation (2).

Discretization of f:

There are multiple methods to discretize a continuous system. We consider the simplest approach of forward difference to rewrite the TCL dynamic state function as $$x(n+1) = x(n) - a\tau x(n) + b\tau(u(n) + \gamma(n)) \qquad \text{(Equation 18)}$$

B&B for discrete IP relaxation: Again consider the B&B approach 320 illustrated in FIG. 3B where at each node the IP is solved with the discrete dynamic equation in Equation 18. One advantage in this case is that we can start with an initial condition that reduces the search space. We can solve x(n+1) given x(0) to determine the total number of switches.

MINLP:

In this scenario, the nonlinear dynamic equation in Equation 3 can be solved. In general, a numerical solver may be utilized to determine the solution at each B&B node. However, the nonlinear equations can be solved to obtain a closed-form solution and reduce the computation time at each B&B tree node.

Closed-Form Solution of NL f:

In general, u is a function of supply air flow rate, specific heat of air, supply air and zone temperatures, and discrete-event state. Here, we define $x = \theta - \theta_a$, then we can write $$\dot{x} = -ax + b(\theta_s - \theta_a - x)u \qquad (19)$$

$$= -ax + \underbrace{b(\theta_s - \theta_a)}_{\alpha} u - bxu \qquad (20)$$

$$= -ax + \alpha u - bxu \qquad (21)$$

The cost function is the same as in Equation (9) but the dynamic equation of the augmented cost is different due to the NL terms in f. Similar to the MILP case, assume the final value is not exact. Then, the state, co-state, and stationary condition equations become $$\dot{x} = -ax + (\alpha - bx)u \qquad \text{(Equation 22)}$$

$$\dot{\lambda} = \lambda(a + bu) \qquad \text{(Equation 23)}$$

$$0 = \alpha u + \lambda(\alpha - bx) \qquad \text{(Equation 24)}$$

When we replace for u in the state and co-state functions based on the stationary condition, we arrive at a set of Bernoulli equations to solve for x and λ as follows $$\dot{x} = -ax - (\alpha - bx)^2 \lambda \qquad \text{(Equation 25)}$$

$$\dot{\lambda} = \lambda a - b\lambda^2(\alpha - bx) \qquad \text{(Equation 26)}$$

In these examples, general optimization questions on forecasting load flexibility are provided for. First, the general formulation with the hybrid automaton model of the TCL is provided. Then, we considered three scenarios relaxing the MINLP problem to MILP, ILP, and then finally continuous relaxation of MINLP using the closed-form solution for the NL dynamic plant equation. For each case, we provided a B&B-based approach to solve the problem. In recent studies, B&B methods have been found superior to outer-approximation algorithms for large scale problems. We described a B&B method which in general reduced the complexity of a generic B&B with strong or fractional branching by considering the sorting of the cost function with respect to the prefix of the switching sequence.

Figure 4:
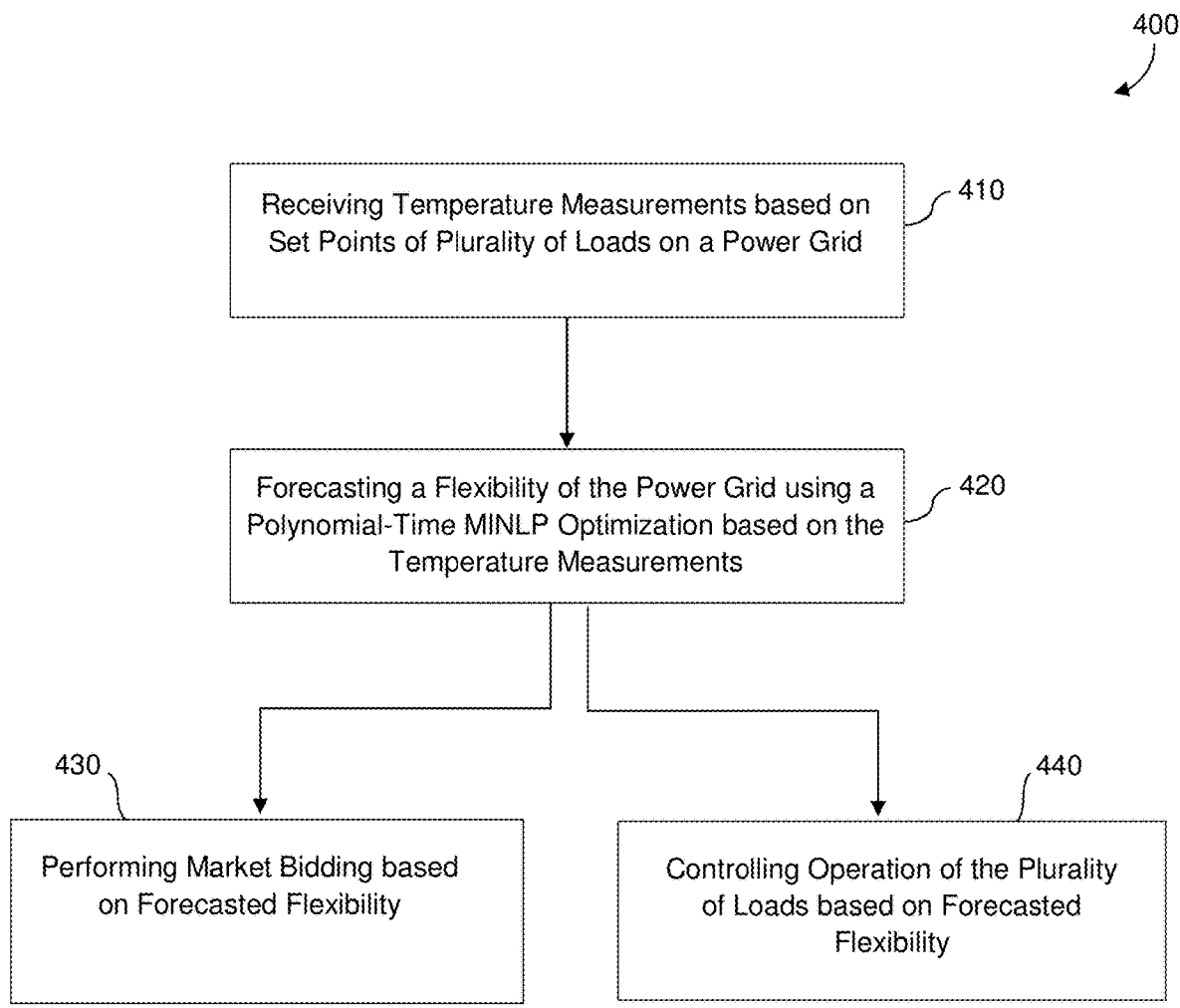
FIG. 4 is a diagram illustrating a method for forecasting load flexibility in accordance with an example embodiment.

FIG. 4 illustrates a method 400 for forecasting load flexibility in accordance with an example embodiment. The method 400 may be performed by the control system 130 shown in FIG. 1, or some other device or combination of devices. Referring to FIG. 4, in 410, the method includes receiving temperature values associated with temperature set points of a plurality of loads that are included on a power grid. In this example, the plurality of loads may include TCLs, HVACs, lighting systems, etc. The temperature values may include set point values of a TCL (i.e., a temperature at which a room or building is set at), an actual room temperature value, an outside air temperature value, a supply air temperature value, and the like. In addition to temperature values, any values related to forecasted load flexibility may be received in 410.

In 420, the method further includes forecasting a flexibility of the plurality of loads using a polynomial-time mixed-integer non-linear programming (MINLP) optimization based on the received temperature values for the plurality of loads (e.g., using Equations 5-7 shown herein). The forecasted flexibility for each load, from among the plurality of loads, may include a minimum and a maximum deviation from a nominal power demand of the load while maintaining a quality of service for the load. The polynomial-time MINLP optimization may include a spatial branch-and-bound (B & B) method such as shown in FIG. 3B. In some embodiments, the polynomial-time MINLP optimization may be performed based on a respective quality of service constraint for each load from among the plurality of loads. In addition to forecasting the load, in 420, the method may also determine an amount of available power at a future point in time (e.g., the following day, the following hour, the following week, etc.) for the power grid based on the forecasted flexibility of the plurality of loads.

According to various embodiments, a number of operations and/or steps can be performed in response to the flexibility of the load being forecasted, for example, the method may output information about the forecasted flexibility for display to a display device. As another example, in 430 the method may perform market bidding for electricity based on the forecasted flexibility of the plurality of loads. As another example, in 440 the method may control the operation of the loads such as TCLs, HVACs, lighting, and the like. For example, in 440 the method may determine operational control updates for the plurality of loads based on the forecasted flexibility and transmit the operational control updates to the plurality of loads. In some cases, the method may perform both 430 and 440 either sequentially or simultaneously.

Figure 5:
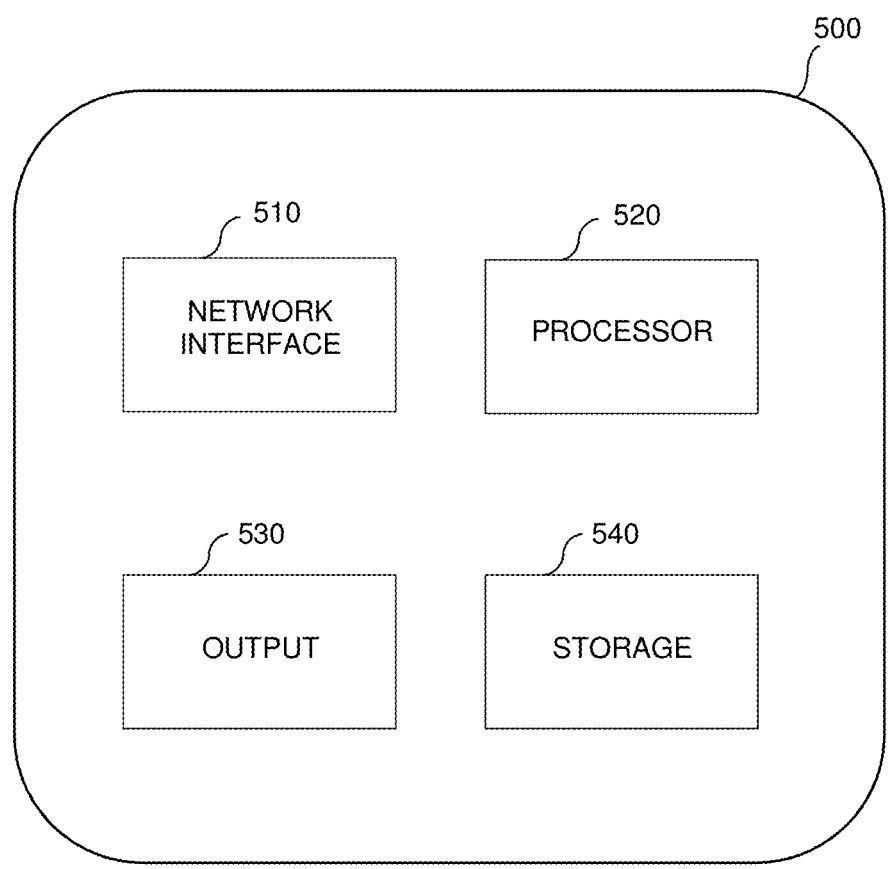
FIG. 5 is a diagram illustrating a computing device for forecasting load flexibility in accordance with an example embodiment.

FIG. 5 illustrates a computing device 500 for forecasting load flexibility in accordance with an example embodiment. For example, the device 500 may be the control system 130 of FIG. 1, or another device. Also, the device 500 may perform the method of FIG. 4. Referring to FIG. 5, the device 500 includes a network interface 510, a processor 520, an output 530, and a storage device 540. Although not shown in FIG. 5, the device 500 may include other components such as a display, an input unit, a receiver/transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud, another device, and the like. The storage device 540 is not limited to any particular storage device and may include any known memory device such as RAM, ROM, hard disk, and the like.

According to various embodiments, the network interface 510 may receive temperature values associated with temperature set points of a plurality of loads that are included on a power grid. In response, the processor 520 may forecast a flexibility of the plurality of loads using a polynomial-time mixed-integer non-linear programming (MINLP) optimization based on the received temperature values for the plurality of loads and/or additional values such as supply air flow, and the like. The output 530 may output information about the forecasted flexibility for display to a display device that may be embedded within the device 500 or connected via a cable, network connection (wired or wireless), or the like. In some examples, the device 500 is a cloud computing system and the display may be a user of a client device that subscribes to the cloud computing system.

In this example, the plurality of loads may include TCLs, HVACs, lighting systems, etc. The temperature values may include set point values of a TCL (i.e., a temperature at which a room or building is set at), an actual room temperature value, an outside air temperature value, a supply air temperature value, and the like. In addition to temperature values, any values related to forecasted load flexibility may be received by the processor 520. The forecasted flexibility for each load, from among the plurality of loads, may be calculated to determine a minimum and a maximum deviation from a nominal power demand of the load while maintaining a quality of service for the load. The polynomial-time MINLP optimization may include a spatial branch-and-bound (B & B) method. In some embodiments, the polynomial-time MINLP optimization may be performed based on a respective quality of service constraint for each load from among the plurality of loads. In addition to forecasting the load, the processor 520 may also determine an amount of available power at a future point in time for the power grid based on the forecasted flexibility of the plurality of loads.

According to various embodiments, a number of operations and/or steps can be performed in response to the flexibility of the load being forecasted, for example, the output 530 may output information about the forecasted flexibility for display to a display device. As another example, the processor 520 may perform market bidding associated with an electricity market based on the forecasted flexibility of the plurality of loads. As another example, the processor 520 may control the operation of the loads such as TCLs, HVACs, lighting, and the like. For example, the processor 520 may determine operational control updates for the plurality of loads based on the forecasted flexibility and transmit the operational control updates to the plurality of loads.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method for forecasting load flexibility based on nominal power demand comprising:
   receiving temperature values associated with temperature set points of a plurality of loads serviced by a power grid;
   forecasting a flexibility of the loads using a polynomial-time mixed-integer non-linear programming (MINLP) optimization based on the received temperature values for the loads, wherein the polynomial-time MINLP optimization is independently performed for each load based on a hybrid automata model of the loads and a respective quality of service constraint of a thermo-static controller for a respective load, wherein the polynomial-time MINLP optimization is solved using a branch-and-bound algorithm having a plurality of nodes corresponding to a sequence of switches that model on and off switching behavior over time for the loads, wherein a cost function analysis is performed before and after each switch in the sequence; and
   determining operational control updates for the loads based on the forecasted flexibility and transmitting the operational control updates to the loads, wherein an amount of power provided by the power grid for operating the loads is based on the operational control updates.

2. The computer-implemented method of claim 1, wherein the forecasted flexibility for each load comprises a minimum and a maximum deviation from a nominal power demand of the load while maintaining the quality of service constraint for the load.

3. The computer-implemented method of claim 1, wherein the loads comprise one or more thermostatically controlled loads (TCL).

4. The computer-implemented method of claim 3, wherein the received temperature values for the one or more TCLs comprises at least one of a zone temperature measurement or a zone set point temperature for each TCL.

5. The computer-implemented method of claim 1, wherein the forecasting further comprises determining an amount of available power at a future point in time for the power grid based on the forecasted flexibility of the loads.

6. The computer-implemented method of claim 1, further comprising performing market bidding for electricity based on the forecasted flexibility of the loads.

7. The computer implemented method of claim 1, wherein the forecasting of the flexibility of the loads using the MINLP optimization based on the received temperature values for the loads is further based on a supply air flow received from one or more of the loads.

8. The computer implemented method of claim 1, wherein one or more of the loads includes a heating, ventilation and air-conditioning (HVAC) system.

9. A computer system for forecasting load flexibility based on nominal power demand comprising:
   a network interface configured to receive temperature values associated with temperature set points of a plurality of loads serviced by a power grid;
   a processor configured to (i) forecast a flexibility of the loads using a polynomial-time mixed-integer non-linear programming (MINLP) optimization based on the received temperature values for the loads, wherein the polynomial-time MINLP optimization is independently performed for each load based on a hybrid automata model of the loads and a respective quality of service constraint of a thermostatic controller for the respective load, wherein the polynomial-time MINLP optimization is solved using a branch-and-bound algorithm having a plurality of nodes corresponding to a sequence of switches that model on and off switching behavior over time for the loads, wherein a cost function analysis is performed before and after each switch in the sequence, and (ii)
   determine operational control updates for the loads based on the forecasted flexibility and transmitting the operational control updates to the loads, wherein an amount of power provided by the power grid for operation of the loads is based on the operational control updates.

10. The computer system of claim 9, wherein the flexibility forecasted by the processor for each load comprises a minimum and a maximum deviation from a nominal power demand of the load while maintaining the quality of service constraint for the load.

11. The computer system of claim 9, wherein the loads comprise one or more of thermostatically controlled loads (TCL).

12. The computer system of claim 11, wherein the received temperature values for the one or more TCLs comprises at least one of a zone temperature measurement or a zone set point temperature for each TCL.

13. The computer system of claim 9, wherein the processor is further configured to determine an amount of available power at a future point in time for the power grid based on the forecasted flexibility of the loads.

14. The computer system of claim 9, wherein the processor is further configured to perform market bidding for electricity based on the forecasted flexibility of the loads.

15. The computer system of claim 9, wherein the processor configured to forecast the flexibility of the loads using the polynomial-time mixed-integer non-linear programming (MINLP) optimization based on the received temperature values for the loads is further configured to forecast the flexibility of the loads using MINLP based on a supply air flow received from one or more of the loads.

16. A non-transitory computer readable medium having stored therein instructions that when executed cause a computer to perform a method for forecasting load flexibility based on nominal power demand, the method comprising:
  receiving temperature values associated with temperature set points of a plurality of loads serviced by a power grid;
  forecasting a flexibility of the loads using a polynomial-time mixed-integer non-linear programming (MINLP) optimization based on the received temperature values for the loads, wherein the polynomial-time MINLP optimization is independently performed for each load based on a hybrid automata model of the loads and a respective quality of service constraint of a thermostatic controller for a respective load, wherein the polynomial-time MINLP optimization is solved using a branch-and-bound algorithm having a plurality of nodes corresponding to a sequence of switches that model on and off switching behavior over time for the loads, wherein a cost function analysis is performed before and after each switch in the sequence; and
  determining operational control updates for the loads based on the forecasted flexibility and transmitting the operational control updates to the loads, wherein an amount of power provided by the power grid for operating the loads is based on the operational control updates.

17. The non-transitory computer readable medium of claim 16, wherein the forecasted flexibility for each load comprises a minimum and a maximum deviation from a nominal power demand of the load while maintaining the quality of service constraint for the load.

18. The non-transitory computer readable medium of claim 16, wherein the instructions that when executed cause the computer to perform the method for forecasting the flexibility of the loads using the polynomial-time mixed-integer non-linear programming (MINLP) optimization based on the received temperature values for the loads is further configured to forecast the flexibility of the loads using MINLP based on a supply air flow received from one or more of the loads.

19. The non-transitory computer readable medium of claim 16, wherein the instructions that when executed cause the computer to perform the method for forecasting further comprises determining an amount of available power at a future point in time for the power grid based on the forecasted flexibility of the loads.

20. The non-transitory computer readable medium of claim 16, wherein one or more of the loads includes a heating, ventilation and air-conditioning (HVAC) system.

* * * * *